United States Patent
Hirano et al.

(10) Patent No.: US 10,550,546 B2
(45) Date of Patent: Feb. 4, 2020

(54) COVER OF WORK VEHICLE, CAB OF WORK VEHICLE, AND WORK VEHICLE

(71) Applicant: Komatsu Ltd., Tokyo (JP)

(72) Inventors: Tomoshi Hirano, Tokyo (JP); Shinjirou Ohki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/078,654

(22) PCT Filed: Mar. 26, 2018

(86) PCT No.: PCT/JP2018/012189
§ 371 (c)(1),
(2) Date: Aug. 22, 2018

(87) PCT Pub. No.: WO2018/159860
PCT Pub. Date: Sep. 7, 2018

(65) Prior Publication Data
US 2019/0360171 A1 Nov. 28, 2019

(51) Int. Cl.
*E02F 9/08* (2006.01)
*E02F 9/16* (2006.01)
*B62D 33/06* (2006.01)

(52) U.S. Cl.
CPC ........ *E02F 9/0891* (2013.01); *B62D 33/0617* (2013.01); *E02F 9/163* (2013.01)

(58) Field of Classification Search
CPC ..... E02F 9/0891; E02F 9/163; B62D 33/0617
See application file for complete search history.

(56) References Cited

U.S. PATENT DOCUMENTS

| | | | | |
|---|---|---|---|---|
| 7,887,124 B2* | 2/2011 | Tsukamoto | ........ | B62D 33/0617 296/190.01 |
| 8,128,155 B2* | 3/2012 | Ansorge | .................. | B60R 21/13 296/190.03 |
| 8,657,057 B2* | 2/2014 | Bolz | .................... | B62D 21/186 180/291 |
| 8,876,196 B2* | 11/2014 | Kondo | .................... | E02F 9/163 296/190.08 |
| 8,905,173 B2* | 12/2014 | Kimura | .................. | B60J 5/0487 180/89.12 |
| 9,315,220 B2* | 4/2016 | Kinoshita | ............... | B60R 21/13 |

(Continued)

FOREIGN PATENT DOCUMENTS

| | | |
|---|---|---|
| JP | 07-138987 A | 5/1995 |
| JP | 2555875 Y2 | 8/1997 |

(Continued)

*Primary Examiner* — Lori L Lyjak
(74) *Attorney, Agent, or Firm* — Locke Lord LLP

(57) ABSTRACT

A cover of a work vehicle that defines a housing space for housing devices, including: a panel body having an obverse surface facing an outside of the housing space and a reverse surface facing an inside of the housing space; a plurality of panels arranged such that the surfaces of the panel bodies are positioned on the same plane; a connecting member having a pair of abutting plates abutting the reverse surfaces of a pair of panel bodies adjacent to each other; and a fixing member provided at abutting portions between each panel body and the connecting member, and detachably fixing each of the panel bodies to the connecting member from the obverse surface side.

8 Claims, 9 Drawing Sheets

(56) References Cited

U.S. PATENT DOCUMENTS

| | | | |
|---|---|---|---|
| D842,344 S * | 3/2019 | Okuyama | ................ D15/23 |
| 2009/0127888 A1 | 5/2009 | Tsukamoto et al. | |
| 2014/0161578 A1 | 6/2014 | Kimura et al. | |
| 2016/0114837 A1 | 4/2016 | Iwahashi et al. | |

FOREIGN PATENT DOCUMENTS

| | | |
|---|---|---|
| JP | 10-183972 A | 7/1998 |
| JP | 3187782 B2 | 7/2001 |
| JP | 4510717 B2 | 7/2010 |
| JP | 2012-136829 A | 7/2012 |
| JP | 2017-053191 A | 3/2017 |
| WO | 2007/010807 A1 | 1/2007 |
| WO | 2013/051609 A1 | 4/2013 |

* cited by examiner

COVER OF WORK VEHICLE, CAB OF WORK VEHICLE, AND WORK VEHICLE

TECHNICAL FIELD

The present invention relates to a cover of a work vehicle, a cab of a work vehicle and a work vehicle.

BACKGROUND TECHNOLOGY

The work vehicle is provided with a cover covering a housing space in which devices are housed. For example, the cover is detachably provided so as to be easily accessible to devices during maintenance (see, for example, Patent Document 1).

PRIOR ART DOCUMENT

[Patent Document]
[Patent Document 1] Japanese Unexamined Patent Application Publication No. 2012-136829

SUMMARY OF THE INVENTION

Problems to be Solved by the Invention

When the volume of the housing space of the devices is large, the cover itself becomes large in accordance therewith. In this case, the burden on the operator who removes the cover when accessing the device increases. On the other hand, it is preferable that the cover has a continuous appearance in order to maintain a good appearance when seen from outside. Further, it is preferable that the cover mounting structure has a structure which does not significantly erode the volume of the housing space.

The present invention is provided to solve the above problems, and the object of the present invention is to provide a cover of a work vehicle, a cab of the work vehicle and the work vehicle which are easy to attach and detach, has a good appearance, and can secure a large housing space.

Means for Solving the Problem

An aspect of the present invention provides a cover of a work vehicle that defines a housing space for housing a device, including: a plurality of panels, each of which has a panel body having an obverse surface facing an outside of the housing space and a reverse surface facing an inside of the housing space, the plurality of panels being arranged so that the obverse surfaces of the panel bodies are positioned on the same plane; a connecting member including a pair of abutting plates respectively abutting the rear surfaces of a pair of the panel bodies adjacent to each other, and a connecting portion connecting the pair of abutting plates; and a fixing member provided at an abutting portion of each of the panel bodies and the connecting member, and detachably fixing each of the panel bodies to the connecting member from the obverse surface side.

According to the cover of the work vehicle of the above described configuration, since the cover has a structure that is divided into a plurality of panels, it is possible to reduce the burden on the worker when the cover is attached and detached by the fixing member. Further, since the plurality of panels are mutually supported by the connecting members, it is not necessary to provide an extra supporting member for supporting each of the panels. Therefore, a large housing space can be secured. Further, it is possible to easily align the panel bodies by fixing the other panel body to the connecting member fixed to the one panel body. Thus, it is possible to reduce the level difference between the surfaces of the panel bodies and to easily realize a continuous appearance shape.

Effect of Invention

According to a cover of the work vehicle, a cab of the work vehicle provided with the cover, and the work vehicle, the cover can be easily attached and detached, and also, it is possible to maintain a good appearance and to secure a large housing space for housing the devices.

MODE FOR CARRYING OUT THE INVENTION

Hereinafter, an embodiment of a wheel loader which is an example of a work vehicle related to a present invention will be described in detail with reference to the drawings.

<Work Vehicle>

Figure 1:
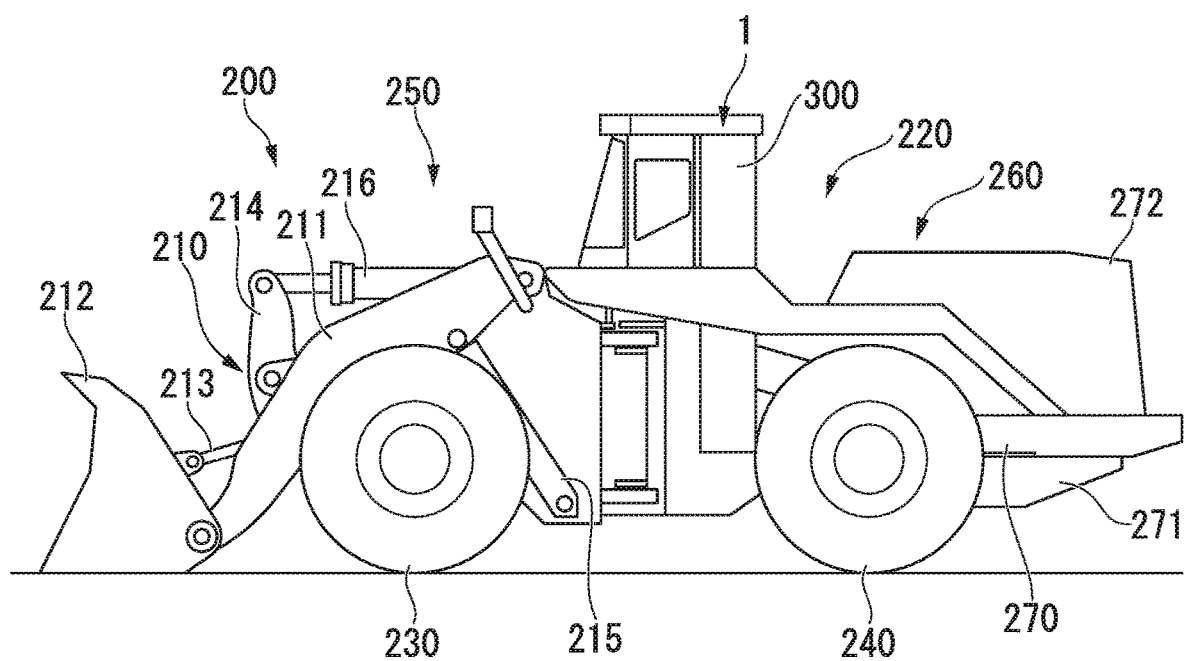
FIG. 1 is a side view of a wheel loader according to an embodiment of the present invention.

As shown in FIG. 1, a wheel loader 200 as a work vehicle includes a work equipment 210 and a vehicle body 220. Hereinafter, the forward-rearward directions, a forward direction, a rearward direction, and a width direction of the wheel loader 200 may be respectively referred to as "forward-rearward directions", "forward", "rearward" and "vehicle width direction". The vehicle width direction may be referred to as "right side" or "left side". A direction toward a center of the vehicle width direction may be referred to as "inner side in the vehicle width direction" and a direction from the center of the vehicle width direction toward right side or left side may be referred to as "outer side in the vehicle width direction". A vertical direction, upward direction, downward direction when the wheel loader 200 is placed on a horizontal surface may be respectively and simply referred to as a "vertical direction", "upward", and "downward".

<Work Equipment>

The work equipment 210 is provided on a front portion of the vehicle body 220. The work equipment 210 has a boom 211 and a bucket 212. The boom 211 is rotatably connected to the vehicle body 220. The bucket 212 is connected to one end of a bell crank 214 via a link 213. A bucket driving cylinder 216 is connected to the other end of the bell crank 214. The bucket 212 is rotatably connected to a tip of the boom 211. The boom 211 is driven by a boom driving cylinder 215, and the bucket 212 is driven by a bucket driving cylinder 216. The boom driving cylinder 215 and the bucket driving cylinder 216 are driven by hydraulic pressure supplied via a hydraulic circuit.

<Vehicle Body>

A vehicle body 220 includes a vehicle front portion 250, a vehicle rear portion 260, front wheels 230, rear wheels 240, and a cab 1.

A vehicle front portion 250 constitutes a front part of a vehicle body 220. The work equipment 210 is provided in a vehicle front portion 250 of the vehicle body 220. A vehicle rear portion 260 constitutes a rear part of the vehicle body 220. The vehicle front portion 250 and the vehicle rear portion 260 are rotatable in a horizontal direction to each other by being connected to each other about an axis extending in the vertical direction. A pair of front wheels 230 is provided in the vehicle front portion 250 and spaced apart in the vehicle width direction. A pair of rear wheels 240 is provided in the vehicle rear portion 260 and spaced apart in the vehicle width direction. When the front wheels 230 and the rear wheels 240 are driven, the vehicle body 220 moves forward and rearward.

The vehicle rear portion 260 includes a rear frame 270, a fuel tank 271, and an exterior cover 272.

The rear frame 270 is a member extending in the forward-rearward directions, and a pair of the rear frames 270 is provided in parallel with each other at a distance in the width direction.

The fuel tank 271 is provided below the rear part of the vehicle rear portion 260 and stores fuel.

The exterior cover 272 is provided above a rear part of the rear frame 270. The exterior cover 272 partitions and forms an engine room in an inside portion of the exterior cover 272. In an engine room, equipment such as an engine which is driven by supplying fuel and a cooling unit to cool the engine is provided. An output of the engine is transmitted to a hydraulic device such as a hydraulic pump or a torque converter, which are not shown, and operates the work equipment 210 and the axle device.

<Cab>

As shown in FIG. 1, the cab 1 is provided above a front part of the rear frame 270.

The cab 1 is fixedly supported by the rear frame 270 via a pair of support structures 300. The support structure 300 has a lower portion fixed to the rear frame 270 and extends upward. A pair of support structures 300 is integrally fixed to the cab 1 in a rear part thereof and both sides thereof in the vehicle width direction.

Figure 2:
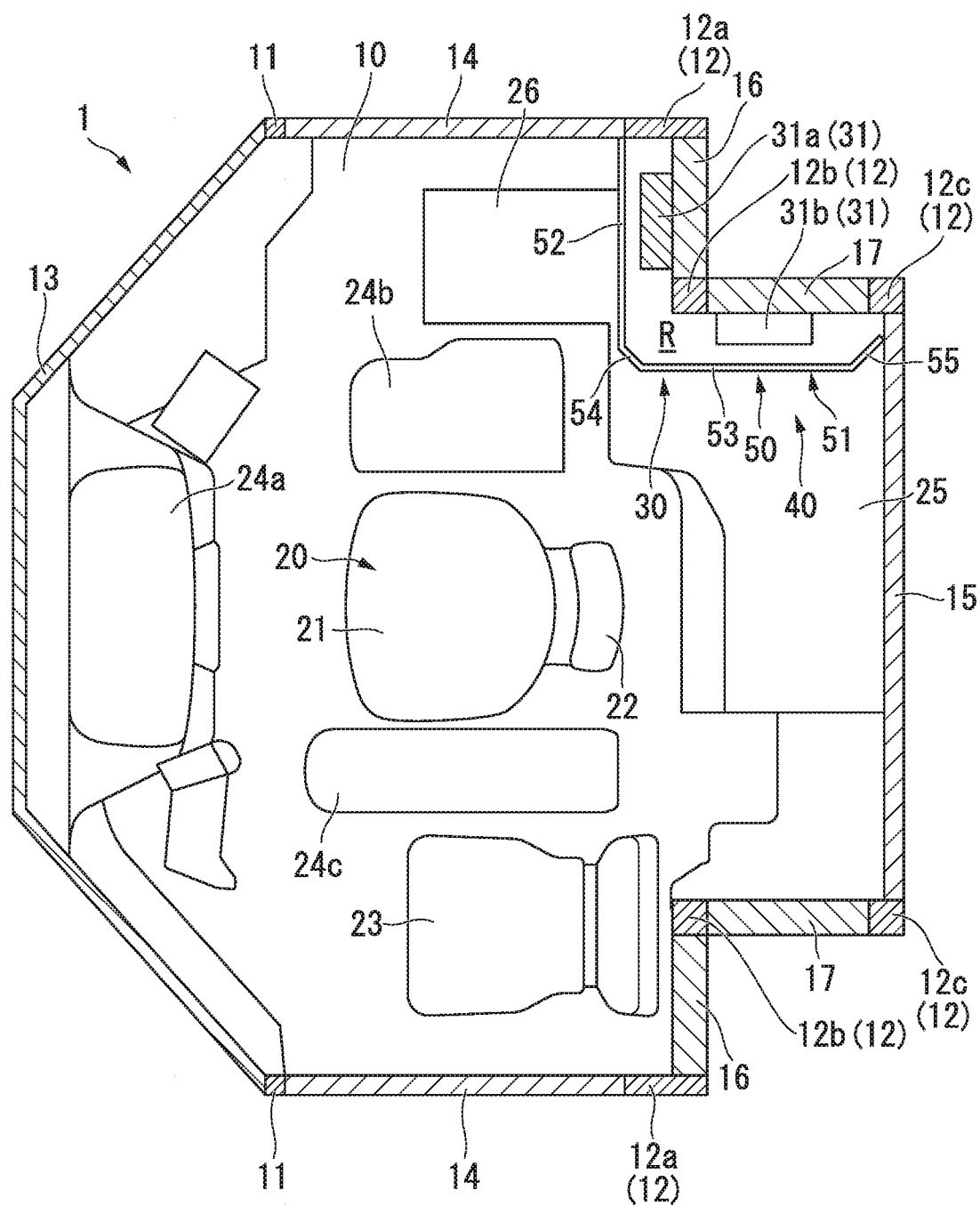
FIG. 2 is a schematic horizontal cross-sectional view of a cab of the wheel loader according to the embodiment of the present invention.

As shown in FIG. 2, the cab 1 includes a floor panel 10, a front pillar 11, a rear pillar 12, a front panel 13, a lateral panel 14, a rear panel 15, a lateral wall portion 16, a vertical wall portion 17, an operator's seat 20, an auxiliary seat 23, a front console 24a, a right console 24b, a left console 24c, a rear housing portion 25, a lateral housing portion 26, and a device housing portion 30.

As shown in FIG. 2, the floor panel 10 is a member which forms a floor surface of the cab 1 and has a plate shape extending along the horizontal surface. The floor panel 10 is placed above the front part of the rear frame 270.

Figure 3:
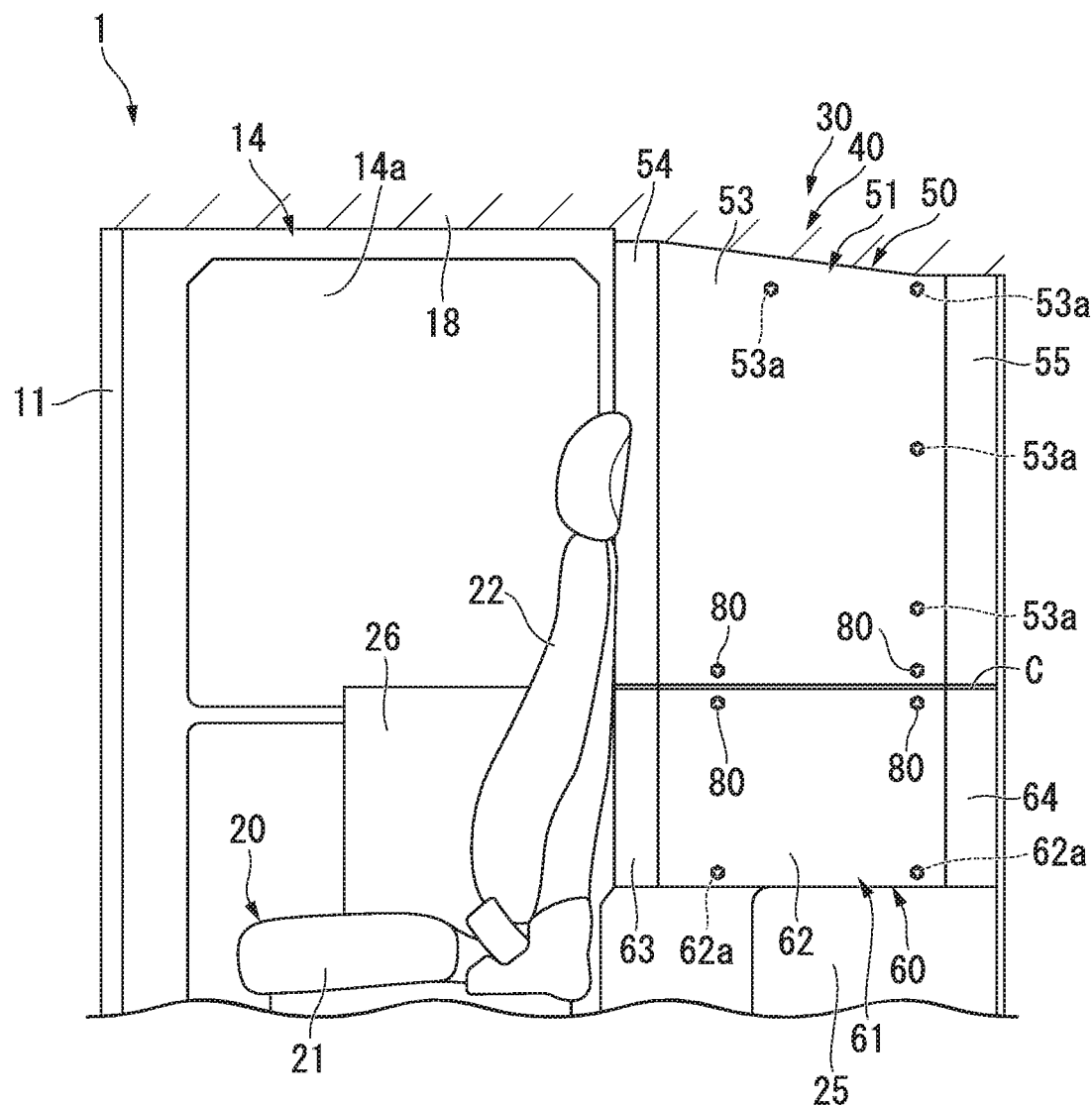
FIG. 3 is a schematic longitudinal cross-sectional view of the cab of the wheel loader according to the embodiment of the present invention.

As shown in FIG. 2 and FIG. 3, the front pillar 11 is a columnar member extending in the vertical direction. A pair of front pillars 11 is provided on a front part of the cab 1 and on both sides in the vehicle width direction so as to be spaced apart at a distance in vehicle width direction. The pair of front pillars 11 extends in the vertical direction so as to be parallel to each other. A lower end of each front pillar 11 is fixed to the floor panel 10.

In the present embodiment, a first rear pillar 12a, a second rear pillar 12b, and a third rear pillar 12c shown in FIG. 2 are provided as the rear pillar 12. The first rear pillar 12a, the second rear pillar 12b, and the third rear pillar 12c are members extending in the vertical direction in the rear part of the cab 1, and each lower end of them is fixed to the floor panel 10. A pair of the first rear pillars 12a, a pair of the second rear pillars 12b, and a pair of the third rear pillars 12c are respectively arranged in both sides in the vehicle width direction.

The first rear pillar 12a is provided rearward in each of the pair of front pillars 11. An interval of the pair of first rear pillars 12a in the vehicle width direction is equal to an interval of the pair of front pillars 11 in the vehicle width direction.

A pair of second rear pillars 12b is provided in the inner side of the pair of first rear pillars 12a in the vehicle width direction. An interval of the pair of second rear pillars 12b in the vehicle width direction is smaller than the interval of the pair of first rear pillars 12a in the vehicle width direction. A position of the second rear pillar 12b in the forward-rearward directions is the same as a position of the first rear pillar 12a in the forward-rearward directions.

The third rear pillar 12c is provided rearward of the second rear pillar 12b. An interval of the pair of third rear pillars 12c in the vehicle width direction is the same as the interval of the pair of second rear pillars 12b in the vehicle width direction. A position of the third rear pillar 12c in the vehicle width direction is the same as a position of the corresponding second rear pillar 12b in the vehicle width direction.

<Front Panel>

As shown in FIG. 2, the front panel 13 is a member having a plate shape and forming a front part of an outer shape of the cab 1. The front panel 13 partitions an operation room which is a space inside the cab 1 from the forward side. The front panel 13 is provided across the pair of front pillars 11. A lower end of the front panel 13 is connected to the floor panel 10. The front panel 13 has a shape convex toward the forward side when seen from a plan view. A front window (not shown) for visually recognizing the front side from the inside of the operation room is provided in part of the front panel 13.

<Lateral Panel>

As shown in FIG. 2 and FIG. 3, the lateral panel 14 constitutes part of the both sides of an outer shape of the cab 1 in the vehicle width direction. A pair of lateral panels 14 is provided to partition the operation room from the both sides in the vehicle width direction. The lateral panel 14 has a plate shape extending in the vertical direction and the forward-rearward directions. A lateral window 14a is provided in part of the lateral panel 14. A front end of the lateral panel 14 is connected to the front pillar throughout the vertical direction thereof. A rear end of the lateral panel 14 is connected to the first rear pillar 12a throughout the vertical direction thereof. A lower end of the lateral panel 14 is connected to the floor panel 10 throughout the forward-rearward directions thereof.

At least one of the pair of lateral panels 14 is rotatably attached to the front pillar 11 and functions as a door for entering and exiting the operation room.

<Rear Panel>

As shown in FIG. 2, the rear panel 15 forms a rear part of an outer shape of the cab 1. The rear panel 15 partitions the operation room from the rearward side. The rear panel 15 has a plate shape extending in the vertical direction and the vehicle width direction. In the rear panel 15, ends of both sides in the vehicle width direction are respectively connected to the pair of third rear pillars 12c throughout the vertical direction thereof. A lower end of the rear panel 15 is connected to the floor panel 10 throughout the vehicle width direction. A rear window (not shown) extending in the vertical direction and the vehicle width direction is provided in the rear panel 15. The rear window is provided on an upper portion of the rear panel 15.

<Lateral Wall Portion>

As shown in FIG. 2, the lateral wall portion 16 is a member extending in the vertical direction and the vehicle width direction and is provided across the first rear pillar 12a and the second rear pillar 12b on the left and right sides of the cab 1. The lateral wall portion 16 is connected to the first rear pillar 12a and the second rear pillar 12b throughout a vertical direction thereof. A lower end of the lateral wall portion 16 is connected to the floor panel 10.

<Vertical Wall Portion>

As shown in FIG. 2, the vertical wall portion 17 is a member extending in the vertical direction and the forward-rearward directions, and is provided across the second rear pillar 12b and the third rear pillar 12c on the left and right sides of the cab 1. The vertical wall portion 17 is connected to the second rear pillar 12b and the third rear pillar 12c throughout the vertical direction. A lower end of the vertical wall portion 17 is connected to the floor panel 10.

As shown in FIG. 3, a ceiling portion 18 supported by each of the front pillars 11 and the rear pillars 12 is provided at the upper portion of the cab 1. The ceiling 18 partitions the cab from above. Each of the front panel 13, the lateral panel 14, the rear panel 15, the lateral wall portion 16, and the vertical wall portion 17 has an upper end connected to the ceiling portion 18.

<Operator's Seat>

As shown in FIG. 2, the operator's seat 20 is provided at the center of the cab formed in the cab 1. A operator's seat 20 has a seat portion 21 provided on a floor surface and a backrest portion 22 rising upward from an rear part of the seat portion 21. A position of the seat portion 21 in the front-rear direction is adjustable, and the seat portion 21 is movable until a position forward of the first rear pillar 12a.

<Auxiliary Seat>

The auxiliary seat 23 is provided at a distance from the left side of the operator's seat 20 in the operation room. The auxiliary seat 23 is provided forward the left side of the lateral wall portion 16.

<Front Console, Right Console, Left Console>

The front console 24a, the right console 24b, and the left console 24c house electronic devices. The front console 24a is provided in the front part of the operation room. The right console 24b is provided in the right side of the operator's seat 20 in the operation room. The left console 24c is located on the left side of the operator's seat 20 in the operation room and is provided between the operator's seat 20 and the auxiliary seat 23.

<Rear Housing Portion>

As shown in FIG. 2 and FIG. 3, the rear housing portion 25 is provided on a floor panel 10 of the rear part of the operation room. The rear housing portion 25 is provided so as to be in contact with the rear panel 15. The rear housing portion 25 is located below the rear window of the rear panel 15. As a result, the rear housing portion 25 does not obstruct a rear side vision from the operator's seat 20 through the rear window. A device 31 such as an air conditioner is provided in the rear housing portion 25.

<Lateral Housing Portion>

As shown in FIG. 2 and FIG. 3, the lateral housing portion 26 is provided on the right side of the operator's seat 20 inside the operation room in the cab 1 and provided on the floor panel 10 and the further right side of the right console 24b. A position of an upper surface of the lateral housing portion 26 is located above an upper surface of the rear housing portion 25. Various electronic devices are housed in the lateral housing portion 26.

<Device Housing Portion>

Figure 4:
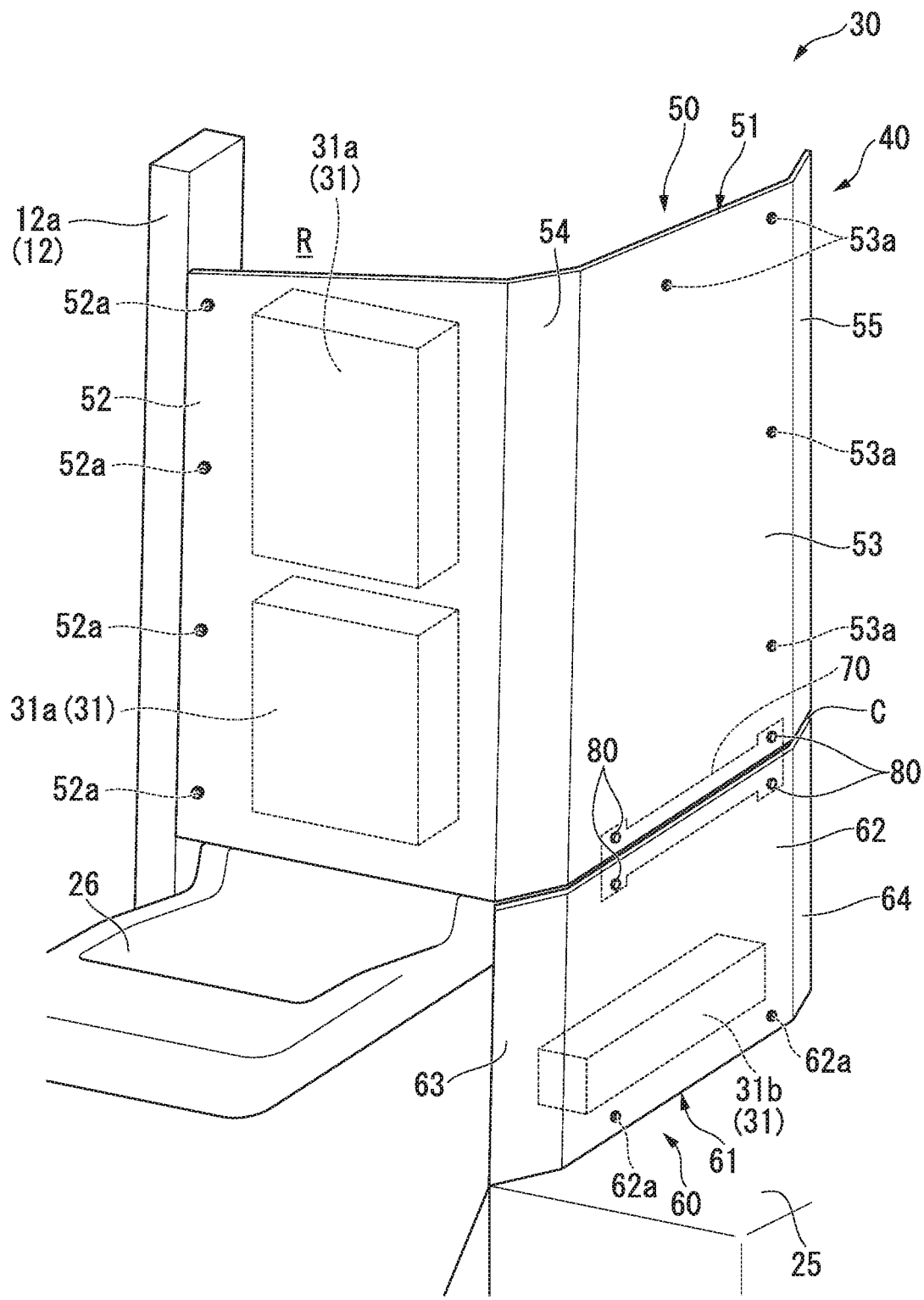
FIG. 4 is a perspective view of a main portion of the cab of the wheel loader according to the embodiment of the present invention.

Next, the device housing portion 30 will be described. As shown in FIG. 2 to FIG. 4, the device housing portion 30 is provided on the right side of the rear part in the operation room inside the cab 1. The device housing portion 30 includes a device 31 and an interior cover 40. In the present embodiment, the device 31 includes an upper portion device 31a and a lower portion device 31b.

<Upper Portion Device>

As shown in FIG. 2, the upper portion device 31a is fixed to the front surface of the lateral wall portion 16. As shown in FIG. 4, two upper portion devices 31a are fixed on the lateral wall portion 16 at a position above the upper surface of the lateral housing portion 26 and are spaced apart from each other in the vertical direction. Each of the two upper portion devices 31a is an electronic device. The upper one of the upper portion devices 31a is, for example, an electronic device such as a data logger for recording various acquired data, an engine controller, or an air conditioner controller. The lower one of upper portion devices 31a is an electronic device such as an information processing device of the entire circumference monitoring system of the wheel loader, for example.

<Lower Portion Device>

As shown in FIG. 2, the lower portion device 31b is fixed on a surface of the vertical wall portion 17 facing the inner side in the vehicle width direction. As shown in FIG. 4, the lower portion device 31b is located above an upper surface of the rear housing portion 25 and below the upper surface of the lateral housing portion 26. The lower portion device 31b is, for example, an electrical device such as a connector which establishes an electrical connection between a lower structure portion and an upper portion structure portion of the cab 1. The lower structure portion and the upper structure portion are electrically connected by connecting the respective harnesses via the connector.

<Interior Cover>

The interior cover 40 partitions and forms a housing space R for housing the device 31 between the right side of the rear pillar 12 of the left and right sides and the interior cover 40. As shown in FIG. 4, the interior cover 40 includes a plurality of panels, a connecting member 70, and a fixing member 80. In the present embodiment, as the plurality of panels, an upper panel 50 and a lower panel 60 arranged in the vertical direction are provided. The housing space R is formed by being partitioned between the upper panel 50 and the lower panel 60 and the rear pillar 12, the lateral wall portion 16 and the vertical wall portion 17.

<Upper Panel>

The upper panel 50 has a panel body 51 which partitions and forms an upper part of the housing space R. A surface of the panel body 51 on the housing space R side is defined as a reverse surface, and a surface opposite to the housing space R side (a surface facing outward the housing space R) is defined as an obverse surface. The panel body 51 is a member having a plate shape extending along a vertical surface. The panel body 51 of the upper panel 50 has a front plate 52, an upper lateral plate 53, a connection inclination plate 54, and an end-portion inclination plate 55.

<Front Plate>

As shown in FIG. 2 and FIG. 4, the front plate 52 has a plate shape extending in the vertical direction and vehicle width direction. The front plate 52 is disposed so as to extend upward from a rear end of the lateral housing portion 26. As shown in FIG. 2, the front plate 52 is disposed at a position in the forward-rearward directions corresponding to a front end of the first rear pillar 12a. An end portion of the front plate 52 on the inner side in the vehicle width direction is positioned further on the inner side of the second rear pillar 12b and the third rear pillar 12c in the vehicle width direction. An end portion of the front plate 52 on the outer side in the vehicle width direction is disposed along the first rear pillar 12a.

<Upper Lateral Plate>

As shown in FIG. 2 to FIG. 4, the upper lateral plate 53 has a plate shape extending in the vertical direction and forward-rearward directions. A lower end of the upper lateral plate 53 is positioned at the same vertical position as a lower end of the front plate 52 and linearly extends in the forward-rearward directions. As shown in FIG. 2, the upper lateral plate 53 is positioned in the inner side of the second rear pillar 12b and the third rear pillar 12c in the vehicle width direction. A front end of the upper lateral plate 53 is positioned rearward the front plate 52.

<Connection Inclination Plate>

As shown in FIG. 2 to FIG. 4, the connection inclination plate 54 is provided between the front plate 52 and the upper lateral plate 53. The connection inclination plate 54 extends diagonally rearward and toward the inner side in the vehicle width direction from an end portion of the front plate 52 in inner side of the vehicle width direction and is connected to the front end of the upper lateral plate 53. The upper lateral plate 53 is connected to an end portion of the front plate 52 on the inner side in the vehicle width direction via the connection inclination plate 54 and extends rearward.

<End-Portion Inclination Plate>

As shown in FIG. 2 to FIG. 4, the end-portion inclination plate 55 is provided on a rear end of the upper lateral plate 53. The end-portion inclination plate 55 is inclined toward the outer side in the vehicle width direction from a rear end of the upper lateral plate 53 while directed rearward.

As shown in FIG. 4, a portion of the front plate 52 on the outer side in the vehicle width direction is fastened to brackets (not shown) provided so as to protrude from the first rear pillar 12a and the lateral wall portion 16 via a plurality of bolts 52a. As shown in FIG. 3 and FIG. 4, an upper portion and a rear portion of the upper lateral plate 53 are fastened to brackets (not shown) protruding from the vertical wall portion 17 and the third rear pillar 12c via a plurality of bolt 53a. Each bolt 52a, 53a is detachable from the obverse surface side of the panel body 51.

<Lower Panel>

The lower panel 60 defines a lower part of the housing space R and has a panel body 61. A surface of the panel body 61 on the housing space R side is defined as a reverse surface, and a surface opposite to the housing space R side is defined as an obverse surface. The panel body 61 is a member having a plate shape and extends along the vertical surface. A panel body 61 of the lower panel 60 has a lower lateral plate 62, a front inclination plate 63, and a rear inclination plate 64.

<Lower Lateral Plate>

The lower lateral plate 62 has a plate shape extending in the vertical direction and the forward-rearward directions. The lower lateral plate 62 is provided below the upper lateral plate 53 so that an obverse surface of the lower lateral plate 62 is located on the same plane as an obverse surface of the upper lateral plate 53. A lower end of the lower lateral plate 62 is connected to an end portion of the rear housing portion 25 on the outer side in the vehicle width direction.

<Front Inclination Plate>

The front inclination plate 63 is provided on a front end of the lower lateral plate 62. The front inclination plate 63 is inclined toward the outer side in the vehicle width direction from a front end of the lower lateral plate 62 while directed forward. An obverse surface of the front inclination plate 63 is provided so as to be positioned in the same plane as an obverse surface of the connection inclination plate 54. A front end of the front inclination plate 63 is connected to a rear end of the lateral housing portion 26 and an end portion of the lateral housing portion 26 on the inner side in the vehicle width direction.

<Rear Inclination Plate>

The rear inclination plate 64 is provided on a rear end of the lower lateral plate 62. The rear inclination plate 64 is inclined toward the outer side in the vehicle width direction from a rear end of lower lateral plate 62 while directed rearward. An obverse surface of the rear inclination plate 64 is provided so as to be positioned on the same plane along the same vertical surface as the end-portion inclination plate 55.

As shown in FIG. 3 and FIG. 4, a lower part of the lower lateral plate 62 is fastened to, for example, brackets (not shown) protruding from the vertical wall portion 17 via a plurality of bolt 62a. Each bolt 62a is detachable from the obverse surface side of the lower lateral plate 62.

Figure 5:
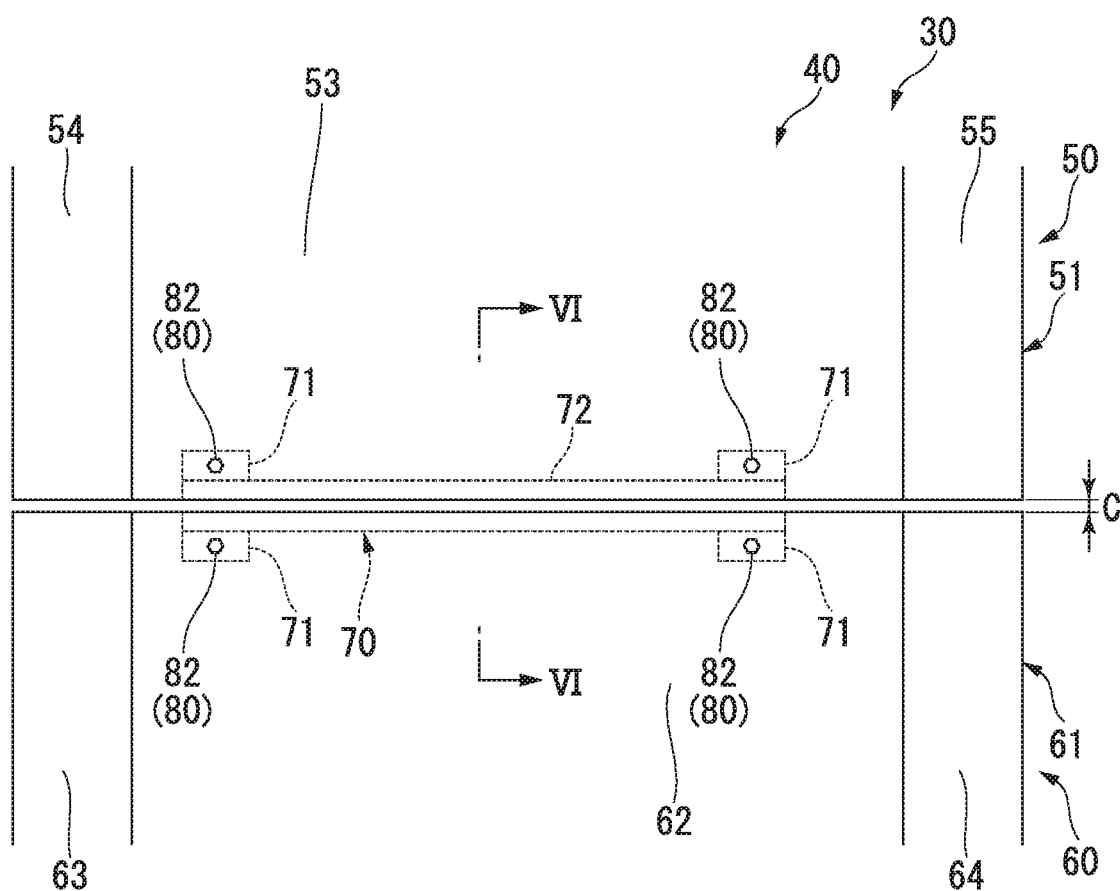
FIG. 5 is a view of an interior cover of a wheel loader according to the embodiment of the present invention when seen from an inner side in the vehicle width direction.

Here, as shown in FIG. 5, the lower end of the upper lateral plate 53 and an upper end of the lower lateral plate 62 are disposed in parallel with each other at a distance in the vertical direction. A lower end of the connection inclination plate 54 and an upper end of the front inclination plate 63 are disposed in parallel with each other at a distance in the vertical direction. A lower end of the end-portion inclination plate 55 and an upper end of the rear inclination plate 64 are disposed in parallel with each other at a distance in the vertical direction. As a result, a gap C is formed between the upper panel 50 and the lower panel 60 which are adjacent to each other. The gap C allows communication between the inside and the outside of the housing space R. A size of the gap C in the vertical direction between the upper panel 50 and the lower panel 60 is made uniform throughout an extending direction of the gap C.

<Panel Edge Portion>

Figure 6:
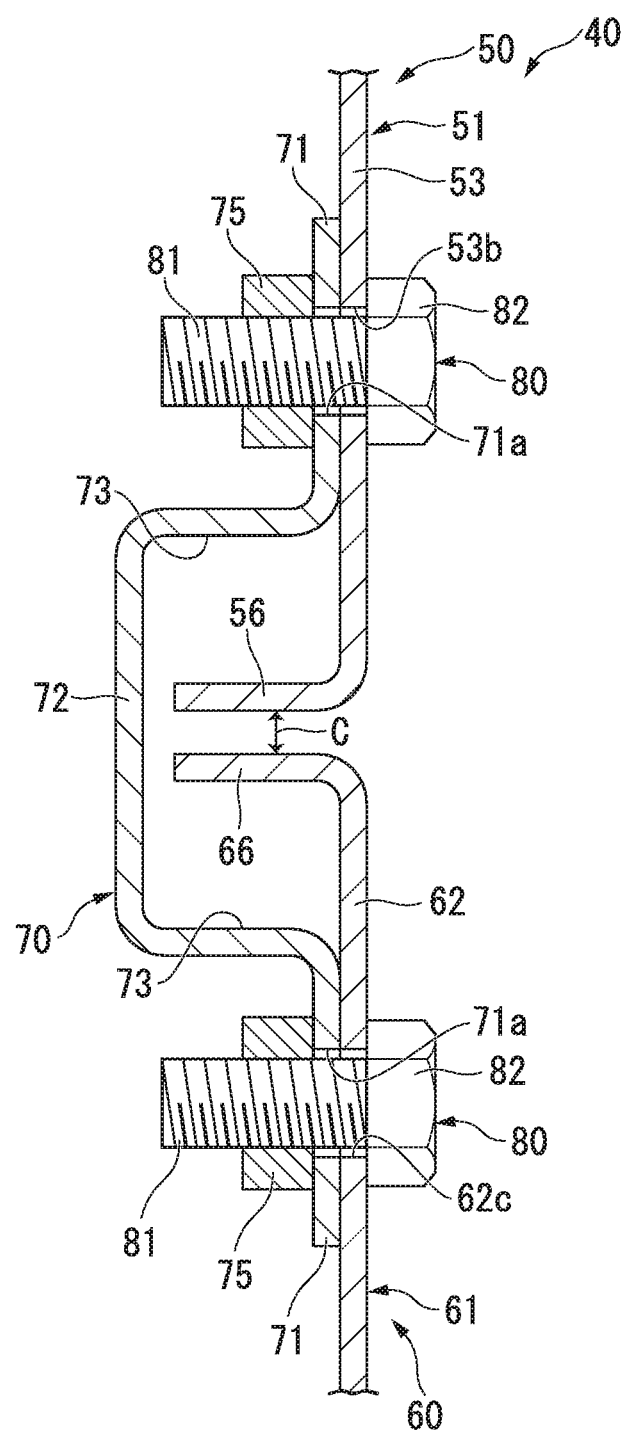
FIG. 6 is a cross-sectional view taken along line VI-VI of FIG. 5.

As shown in FIG. 6, panel edge portions 56, 66 extending toward an inside of the housing space R are respectively provided at the lower end of the upper lateral plate 53 and the upper end of the lower lateral plate 62. The panel edge portions 56, 66 are provided throughout an extending direction of the lower end of the upper lateral plate 53 and the upper end of the lower lateral plate 62. The panel edge portion 56 of the upper panel 50 may be provided on lower ends of the connection inclination plate 54 and the end-portion inclination plate 55. The panel edge portion 66 of the lower panel 60 may be provided on upper ends of front inclination plate 63 and the rear inclination plate 64. Also, the panel edge portions 56, 66 may be provided on an alternative end portion of the upper panel 50 and the lower panel 60.

<Connecting Member>

As shown in FIG. 5 and FIG. 6, the connecting member 70 is provided over the reverse surface of the upper panel 50 and the reverse surface of the lower panel 60. The connecting member 70 includes, for example, an abutting plate 71, a connecting portion 72, and a nut 75. The connecting member 70 is connected only to the upper panel 50 and the lower panel 60. In other words, the connecting member 70 is held only by the upper panel 50 and the lower panel 60 and is not supported by other structures.

<Abutting Plate>

The abutting plate 71 is a member having a plate shape and a pair of the abutting plates is provided at a distance in the vertical direction which is an arrangement direction of the upper panel 50 and the lower panel 60. One abutting plate 71 of the pair of abutting plates abuts on a reverse surface of the upper lateral plate 53 of the upper panel 50. The other abutting plate 71 of the pair of abutting plates abuts on the reverse surface of the lower lateral plate 62 of the lower panel 60. The positions where the abutting plates 71 arranged in the vertical direction abut the upper lateral plate 53 and the lower lateral plate 62 are the same in the forward-rearward directions. When the pair of abutting plates 71 of the present embodiment is deemed as one set, two sets thereof are provided at a distance in the forward-rearward directions which are the extending direction of the lower end of the upper lateral plate 53 and the upper end of the lower lateral plate 62. In addition, a female screw hole may be provided in the abutting plate 71 without using the nut 75.

<Connecting Portion>

A connecting portion 72 connects a pair of abutting plates 71 provided at a distance vertically. A lower end of the abutting plate 71 which abuts on the upper lateral plate 53 is integrally provided on an upper end of the connecting portion 72. An upper end of the abutting plate 71 which abuts on the lower lateral plate 62 is integrally provided on a lower end of the connecting portion 72. The connecting portion 72 extends in a bar shape in the extending direction of the lower end of the upper lateral plate 53 and the upper end of the lower lateral plate 62 so as to straddle the reverse surface of the upper lateral plate 53 of the upper portion panel 50 and the reverse surface of the lower lateral plate 62 of the lower portion panel 60. As a result, the connecting portion 72 connects each of the two sets of abutting plates 71 spaced apart in the extending direction.

As shown in FIG. 6, in the connecting portion 72, a cross-sectional shape orthogonal to the extending direction of the connecting portion 72 (a direction perpendicular to the paper surface of FIG. 6) has a U-shape protruding toward the housing space R side. A pair of facing surfaces 73 facing each other in the vertical direction and each of which extends from the respective abutting plates 71 to the inside of the housing space R, is formed in a portion corresponding to inner sides of the U-shape. The panel edge portion 56 of the upper panel 50 and the panel edge portion 66 of the lower panel 60 are each housed between the pair of facing surfaces 73.

<Nut>

The nut 75 is integrally fixed to a surface of the abutting plate 71 of the connecting member 70 on a side opposite to the upper lateral plate 53 side and the lower lateral plate 62 side, for example, by welding or the like. A female screw is formed on the inside surface of a hole of the nut 75. A direction in which the central axial line of the hole extends coincides with a thickness direction of the abutting plate 71. A through hole 71a is formed in the abutting plate 71 corresponding to the hole of the nut 75. An inner diameter of the through hole 71a may be larger than an inner diameter of the hole of the nut 75.

<Fixing Member>

The fixing member 80 detachably fixes the panel body 51 of the upper panel 50 and the panel body 61 of the lower panel 60 from the obverse side with respect to the connecting member 70. The fixing members 80 are provided at abutting portions between the upper portion panel 50 and the connecting member 70 and between the lower portion panel 60 and the connecting member 70.

The fixing member 80 of the present embodiment is a bolt. The fixing member 80 fixes the upper lateral plate 53 and the lower lateral plate 62 to the connecting member 70 via a nut 75. That is, as shown in FIG. 6, the upper side plate 53 and the lower side plate 62 are formed with through holes 53b, 62c penetrating into and out of the housing space R at fixed positions. The inner diameters of the through holes 53b, 62c are larger than an outer diameter of the shaft portion 81 of the fixing member 80. The fixing member 80 is inserted from the tip of the shaft portion 81 so as to pass through the through holes 53b, 62c of the upper lateral plate 53 or the lower lateral plate 62 and the through hole 71a of the abutting plate 71 of the connecting member 70. The male screw of the shaft portion 81 of the fixing member 80 is fastened to the female screw of the hole of the nut 75, thereby the upper lateral plate 53, the lower lateral plate 62 and the connecting member 70 are fixed integrally. A washer may be interposed between a head portion 82 of the fixing member 80 and the upper lateral plate 53 and the lower lateral plate 62. Alternatively, without using the nut 75, the shaft portion 81 of the fixing member 80 as a male screw is fastened to the through hole 71a of the abutting plate 71 as a female screw hole, whereby the upper lateral plate 53, the lower lateral plate 62, and the connecting member 70 may be fixed integrally.

<Operation and Effects>

When an operator accesses the upper portion device 31a and the lower portion device 31b during maintenance, for example, part of the interior cover 40 is removed. That is, for example, when accessing the upper portion device 31a, the bolts 52a, 53a of the upper panel 50 and the fixing members 80 are removed, thereby the upper panel 50 only is removed from the device housing portion 30. On the other hand, when accessing the lower portion device 31b, the bolts 62a of the lower panel 60 and the fixing members 80 are removed, thereby the lower panel 60 only is removed from the device housing portion 30. Also, when accessing both the upper portion device 31a and the lower portion device 31b, the upper panel 50 and the lower panel 60 can be individually removed without any restriction on the order of removal. In other words, when it is desired to remove only one of the panels, it is possible to remove only the panel to be removed while leaving the panel which is not necessary to be removed.

As a result, it is possible to easily access the upper portion device 31a and the lower portion device 31b, for example, as compared with the case where the interior cover 40 is composed of only one panel. That is, for example, in the case where the interior cover 40 is composed of a single panel, it is necessary to remove the entire panel even when accessing either one of the upper portion device 31a and the lower portion device 31b. Since the size of the panel also increases in accordance with the size of the housing space R of the device 31, it is not easy to detach and attach one panel which is a heavy object.

In contrast, in the present embodiment, since the panel of the interior cover 40 is divided into the upper panel 50 and the lower panel 60, the upper panel 50 and the lower panel 60 can be individually removed. As a result, the weight per panel is reduced, so that the burden on the worker can be reduced.

Further, even in a space in the cab 1 having a comparatively small space, since the panel is divided into a plurality of parts, the attaching and detaching work can be easily performed.

The lower part of the upper panel 50 and the upper part of the lower panel 60 are connected to each other by the connecting member 70 and the fixing member 80. In other word, the upper panel 50 and the lower panel 60 are configured to support each other via the connecting member 70. Therefore, it is not necessary to separately provide a bracket, or the like, for supporting the lower portion of the upper panel 50 and the upper portion of the lower panel 60. Therefore, it is possible to avoid eroding the volume of the housing space R by the support member such as the bracket, and the housing space R can be effectively utilized. As a result, it is possible to increase the degree of freedom in the placement layout of the devices and to easily retrofit new devices.

Here, in a case where the lower part of the upper panel 50 and the upper part of the lower panel 60 are supported by individual brackets respectively fixed to the rear pillar 12 and the like, the upper panel 50 and the lower panel 60 are aligned with each other manually with reference to these brackets. In this case, the relative positions of the upper panel 50 and the lower panel 60 are affected by manufacturing errors of two brackets. Therefore, the surface of the upper lateral plate 53 of the upper panel 50 and the surface of the lower lateral plate 62 of the lower panel 60 are deviated from the same plane, and may impair a good appearance.

In this regard, according to the present embodiment, the lower part of the upper panel 50 and the upper part of the lower panel 60 are supported by one connecting member 70 that connects them to each other. Therefore, it is possible to suppress deviation caused by manufacturing errors as in the case of using two brackets. Further, when positioning the upper panel 50 and the lower panel 60 while connecting the upper panel 50 and the lower panel 60 by the connecting member 70, it is possible to prevent the surface of the upper panel 50 and the surface of the lower panel 60 from being deviated from the same plane. Thus, it possible to obtain a continuous appearance of the surface of the upper lateral plate 53 of the upper panel 50 and the surface of the lower lateral plate 62 of the lower panel 60, and it is possible to ensure a good appearance.

Further, the fixing member 80 is fastened in a state in which the positions of the upper and lower through holes 71a of the connecting member 70 are aligned with the through holes 53b, 62c of the upper panel 50 or the lower panel 60. As a result, since the gap C between the upper panel 50 and the lower panel 60 is defined, a constant gap C can be secured and thus a good appearance can be ensured.

Furthermore, in the present embodiment, since the connecting member 70 is provided on the reverse surface side of the upper panel 50 and the lower panel 60, it is possible to suppress unevenness on the obverse surface side of the upper panel 50 and the lower panel 60. From this point of view, it is possible to further ensure a good appearance. At the same time, since it is possible to minimize the step portion and protruding portion on the obverse surface side, safety can also be secured.

Also, in the present embodiment, since the panel edge portions 56, 66 are provided on the upper panel 50 and the lower panel 60, it is possible to touch the panel edge portions 56, 66 without touching a sharp cross section when holding the upper panel 50 and the lower panel 60. In other words, it is possible to enhance the safety of the end portions of the upper panel 50 and the lower panel 60 when attaching and detaching the upper panel 50 and the lower panel 60.

When the upper panel 50 and the lower panel 60 are attached, the end portions of the upper panel 50 and the lower panel 60 are housed inside the connecting portion 72. Therefore, the panel edge portions 56, 66 do not obstruct the attachment and detachment.

Further, in the present embodiment, the panel edge portions 56, 66 of the upper panel 50 and the lower panel 60 are vertically faced against the facing surfaces 73 in a state of being housed between the facing surfaces 73 of the connecting member 70.

As a result, when attaching the upper panel 50 and the lower panel 60, since the approximate attachment positions of the upper panel 50 and the lower panel 60 can be known with reference to the facing surface 73, the attachment work can be easily performed.

Further, when attaching and detaching the lower panel 60 is manually performed, even if the lower panel 60 accidentally slips down from the hand, the panel edge portion 66 is caught by the lower facing surface 73, thereby it is possible to prevent further falling Thus, it is possible to enhance the safety of the attaching and detaching work.

In the present embodiment, the device housing portion 30 is disposed on the rear pillar 12 side on one side in the vehicle width direction. Therefore, the device housing portion 30 does not obstruct the vision on the rearward side from the operator's seat 20 through the rear window. Further, the device 31 may be disposed along the rear pillar 12 and on an upper part thereof. As a result, it is possible to dispose an electronic device that is relatively weak against dirt, dust, and moisture away from the floor surface.

Further, since the upper portion device 31a is disposed at a position corresponding to the upper panel 50 and the lower portion device 31b is disposed at a position corresponding to the lower panel 60, when accessing any of the devices 31, it is sufficient to remove only one of the upper panel 50 and the lower panel 60.

Furthermore, the upper portion device 31a is provided on the reverse surface side of the front panel of the upper panel 50, and the lower portion device 31b is provided on the reverse surface side of the lower lateral plate 62 in the lower panel 60. Thus, even when different workers access the lower portion device 31b and the upper portion device 31a, each of the works does not interfere with each other.

OTHER EMBODIMENTS

Although the embodiment of the present invention has been described as above, the present invention is not limited thereto and can be appropriately changed without departing from the technical idea of the present invention.

Figure 7:
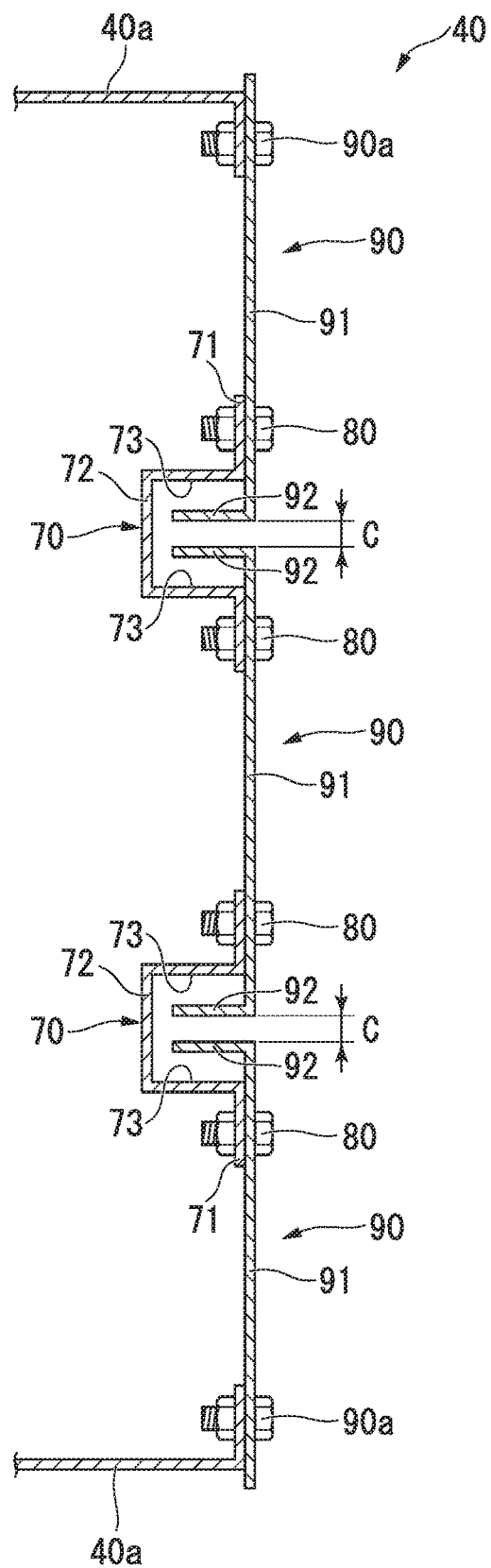
FIG. 7 is a longitudinal cross-sectional view showing a first modification of an interior cover relating to the embodiment of the present invention.

As a first variation of the embodiment, for example, an interior cover 40 shown in FIG. 7 may be used. The interior cover 40 has a plurality of (three in this modification) panels 90 which are sequentially arranged vertically. The surfaces of the panel bodies 91 in the panels 90 are arranged on the same plane. Each panel 90 is connected to one another by the connecting member 70 and the fixing member 80 similar to the embodiment described above. In the connection portions, the panel edge portion 92 of each panel 90 is housed between the facing surfaces 73 of the connecting member 70. An upper end of the uppermost panel 90 is supported by the fixing member 90*a* via a bracket 40*a*. A lower end of the lowermost panel 90 is supported by the fixing member 90*a* via a bracket 40*a*.

Even when the interior cover 40 has three or more panels 90 as described above, it is possible to attach and detach the respective panels 90 individually by connecting the panels 90 adjacent to each other with the connecting member 70 and the fixing member 80.

Figure 8:
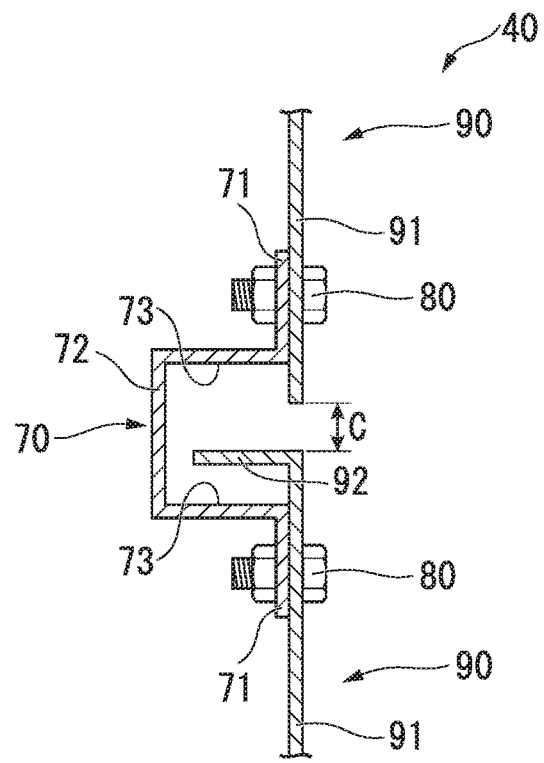
FIG. 8 is a longitudinal cross-sectional view showing a second modification of the interior cover relating to the embodiment of the present invention.

As a second modification of the embodiment, for example, an interior cover 40 shown in FIG. 8 may be used.

In the interior cover 40, the panel edge portion 92 is not provided at the lower end of the upper panel 90 of the panels 90 adjacent to each other. As a result, similarly to the above, it is possible to achieve a good appearance and the operation and effects that each panel 90 can individually attached and detached.

Figure 9:
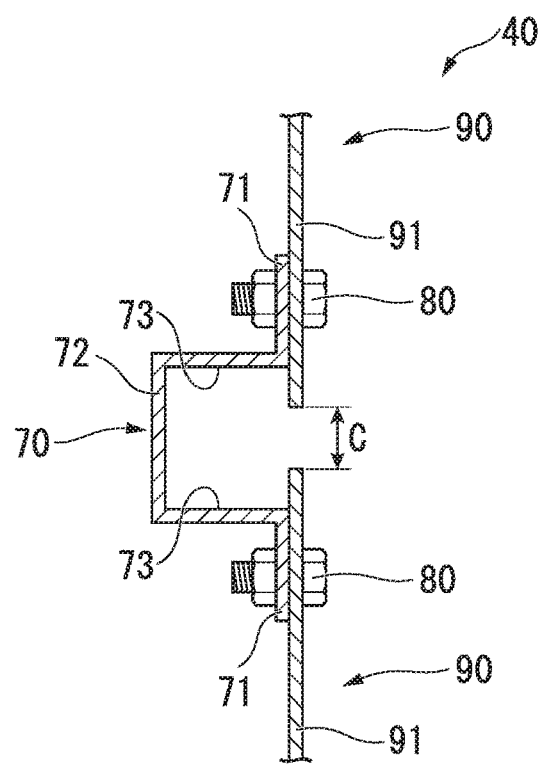
FIG. 9 is a longitudinal cross-sectional view showing a third modification of the interior cover relating to the embodiment of the present invention.

As a third modification of the embodiment, for example, an interior cover 40 shown in FIG. 9 may be used.

In the interior cover 40, any panels 90 adjacent to each other do not have the panel edge portion 92 on the end portion of the panel body 91. Thus, similarly to the above, it is possible to achieve a good appearance and the operation and effects that each panel 90 can individually attached and detached.

Figure 10:
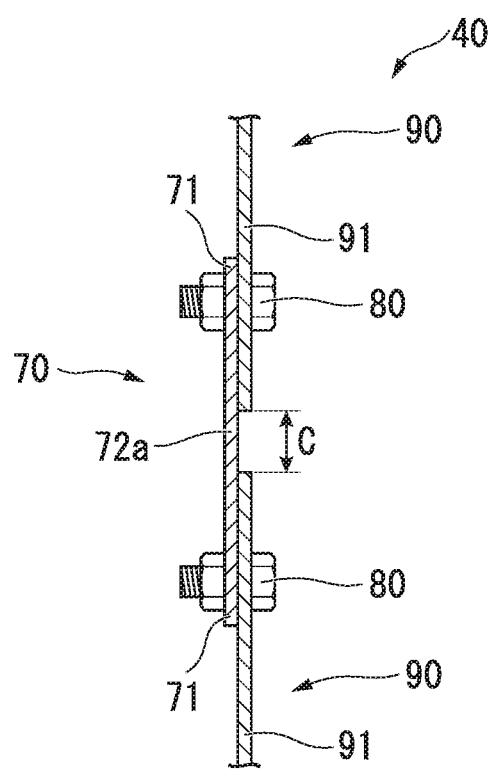
FIG. 10 is a longitudinal cross-sectional view showing a fourth modification of the interior cover relating to the embodiment of the present invention.

As a fourth modification of the embodiment, for example, an interior cover 40 shown in FIG. 10 may be used. The interior cover 40 has a panel 90 similar to the third modification. The connecting portion 72*a* of the connecting member 70 of the interior cover 40 according to the fourth modification has a plate shape extending flush with the pair of abutting plates 71. Also by the above, it is possible to attach and detach the panels 90 adjacent to each other individually.

In the embodiments and the modifications, the example in which the panels 90 are arranged in the vertical direction has been described; however, it may be arranged in other directions such as the horizontal direction.

In the embodiments and the modifications, the example in which the present invention is applied to the interior cover 40 in the cab 1 has been described; however, the present invention is not limited thereto. For example, the present invention may be applied to part of the exterior cover 272. In this case as well, the exterior cover 272 is constituted by a plurality of panels 90, and each of the panels 90 is connected by the connecting member 70 and the fixing member 80, thereby the same operation and effects as described above is obtained.

Although an example in which the first rear pillar 12*a*, the second rear pillar 12*b*, and the third rear pillar 12*c* are provided as the rear pillar 12 has been described in the embodiment, it may be a configuration in which only a pair of left and right rear pillars is used.

In the embodiment, an example in which the present invention is applied to the wheel loader 200 has been described. However, the present invention may be applied to other work vehicles such as a hydraulic excavator, a bulldozer, a dump truck, a motor grader and the like.

INDUSTRIAL APPLICABILITY

According to a cover of a work vehicle, a cab of the work vehicle provided with the cover of a work and the work vehicle of the present invention, the cover such as an interior cover and an exterior cover can be easily attached and detached, a good appearance can be maintained, and further, a large housing space for housing the devices can be secured.

EXPLANATION OF REFERENCE SIGN

1: Cab
10: Floor Panel
11: Front Pillar
12: Rear Pillar
12*a*: First Rear Pillar
12*b*: Second Rear Pillar
12*c*: Third Rear Pillar
13: Front Panel
14. Lateral Panel
14*a*: Lateral Window
15: Rear Panel
16: Lateral Wall Portion
17: Vertical Wall Portion
18: Ceiling Portion
20: Operator's Seat
21: Seat Portion
22: Backrest Portion
23: Auxiliary Seat
24*a*: Front Console
24*b*: Right Console
24*c*: Left Console
25: Rear Housing Portion
26: Lateral Housing Portion
30: Device Housing Portion
31: Device
31*a*: Upper Portion Device
31*b*: Lower Portion Device
40: Interior Cover
40*a*: Bracket
50: Upper Panel
51: Panel Body
52. Front Plate
52*a*: Bolt
53: Upper Lateral Plate
53*a*: Bolt
53*b*: Through Hole
54: Connection Inclination Plate
55: End-Portion Inclination Plate
56: Panel Edge Portion
60: Lower Panel
61: Panel Body
62: Lower Lateral Plate
62*a*: Bolt
62*c*: Through Hole
63: Front Inclination Plate
64: Rear Inclination Plate
66: Panel Edge Portion
70: Connecting Member
71: Abutting Plate
71*a*: Through Hole
72: Connection Portion
72*a*: Connection Portion
73: Facing Surface
75: Nut
80: Fixing Member
81: Shaft Portion
82: Head Portion
90: Panel
90*a*: Bolt
91: Panel Body 92: Panel Edge Portion
200: Wheel Loader (Work Vehicle)
210: Work Equipment
211: Boom
212: Bucket
213: Link
214: Bell Crank
215: Boom Driving Cylinder
216: Bucket Driving Cylinder
220: Vehicle Body
230: Front Wheel
240: Rear Wheel
250: Vehicle Front Portion
260. Vehicle Rear Portion
270: Rear Frame
271: Fuel Tank
272: Exterior Cover
300: Support Structure
C: Gap
R: Housing Space

The invention claimed is:

1. A cover of a work vehicle that defines a housing space for housing a device, comprising:
a plurality of panels, each of which has a panel body having an obverse surface facing an outside of the housing space and a reverse surface facing an inside of the housing space, the plurality of panels being arranged so that the obverse surfaces of the panel bodies are positioned on the same plane;
a connecting member including a pair of abutting plates respectively abutting the rear surfaces of a pair of the panel bodies adjacent to each other, and a connecting portion connecting the pair of abutting plates; and
a fixing member provided at an abutting portion of each of the panel bodies and the connecting member, and detachably fixing each of the panel bodies to the connecting member from the obverse surface side.

2. The cover of the work vehicle according to claim 1, wherein the connecting member is connected to and held by only the pair of panel bodies.

3. The cover of the work vehicle according to claim 1, wherein the connecting portion includes a pair of facing surfaces facing in an arrangement direction and each of which extends from the respective abutting plates to the inside of the housing space, and
the panel further includes a panel edge portion extending from an end portion of the panel body in the arrangement direction to the inside of the housing space and housed between the facing surfaces.

4. The cover of a work vehicle according to claim 1, wherein a gap is formed between a pair of panel bodies adjacent to each other to allow communication between an outside and the inside of the housing space.

5. A cab of a work vehicle comprising:
rear pillars extending in a vertical direction and provided on both sides in a vehicle width direction;
a cover of the work vehicle according to claim 1 as an interior cover that defines the housing space between the rear pillar on at least one side in vehicle width direction of the rear pillars on the both sides in the vehicle width direction and in which the plurality of panels is arranged in a vertical direction;
a device provided in the housing space; and
a rear window provided across the rear pillars on the both sides in the vehicle width direction.

6. The cab of the work vehicle according to claim 5, wherein a plurality of the devices are provided in the vertical direction so as to correspond to the plurality of panels.

7. The cab of the work vehicle according to claim 6, wherein an upper panel and a lower panel as a plurality of panels are provided,
wherein a panel body of the upper panel includes:
a front plate facing forward; and
an upper lateral plate connected to an end portion of the front plate on the inner side in the vehicle width direction and extending rearward,
wherein a panel body of the lower panel includes:
a lower lateral plate disposed below the upper lateral plate so that the obverse surface of which is positioned on the same plane as an obverse surface of the upper portion lateral plate,
wherein one of the pair of abutting plates abuts the reverse surface of the upper lateral plate, and
the other of the pair of abutting plates abuts the reverse surface of the lower lateral plate, and
wherein an upper portion device and a lower portion device as the plurality of devices are provided,
the upper portion device is provided on the reverse surface side of the front plate of the upper panel, and
the lower portion device is provided on a reverse surface side of a lower lateral plate of the lower panel.

8. A work vehicle comprising:
the cover of the work vehicle according to claim 1 as an exterior cover; and
the device is provided in the housing space.

* * * * *